(12) United States Patent
Ho et al.

(10) Patent No.: US 11,360,522 B2
(45) Date of Patent: Jun. 14, 2022

(54) RETRACTABLE STRUCTURE FOR A COMPUTING DEVICE

(71) Applicant: HEWLETT-PACKARD DEVELOPMENT COMPANY, L.P., Houston, TX (US)

(72) Inventors: Chi-Chung Ho, Taipei (TW); Chih-Hsiang Chien, Taipei (TW); Aki Laine, Houston, TX (US); Dimitre Mehandjiysky, Houston, TX (US); Michael Delpier, Houston, TX (US)

(73) Assignee: Hewlett-Packard Development Comany, L.P., Spring, TX (US)

( * ) Notice: Subject to any disclaimer, the term of this patent is extended or adjusted under 35 U.S.C. 154(b) by 1767 days.

(21) Appl. No.: 15/035,312

(22) PCT Filed: Dec. 11, 2013

(86) PCT No.: PCT/US2013/074446
§ 371 (c)(1),
(2) Date: May 9, 2016

(87) PCT Pub. No.: WO2015/088520
PCT Pub. Date: Jun. 18, 2015

(65) Prior Publication Data
US 2021/0311528 A1 Oct. 7, 2021

(51) Int. Cl.
*G06F 1/16* (2006.01)
(52) U.S. Cl.
CPC .......... *G06F 1/1681* (2013.01); *G06F 1/1616* (2013.01); *G06F 1/1654* (2013.01)

(58) Field of Classification Search
None
See application file for complete search history.

(56) References Cited

U.S. PATENT DOCUMENTS

| | | |
|---|---|---|
| 5,901,934 A | 5/1999 | Wilson |
| 6,593,859 B1 | 7/2003 | Watanabe |
| 7,075,781 B2 | 7/2006 | Peng |
| 7,566,043 B2 * | 7/2009 | Chen ................. G06F 1/1616 248/188.2 |

(Continued)

FOREIGN PATENT DOCUMENTS

| | | |
|---|---|---|
| CN | 2679734 | 2/2005 |
| CN | 201628889 U | 11/2010 |

(Continued)

OTHER PUBLICATIONS

Till Schonborn, "Review Dell Vostro 3360 Notebook," Jun. 15, 2012, pp. 1-13, notebookcheck.net.

*Primary Examiner* — Anthony Q Edwards
*Assistant Examiner* — Rashen E Morrison
(74) *Attorney, Agent, or Firm* — HP Inc. Patent Department

(57) ABSTRACT

Examples disclosed herein provide a retractable structure for a computing device. The computing device can include a base member and a hinge assembly to couple a display member to the base member. The structure can be disposed within the base member such that the structure can be retractable within a rear sidewall of the base member and extendable from the rear sidewall when the hinge assembly is in an open position with respect to the base member.

14 Claims, 9 Drawing Sheets

(56) References Cited

U.S. PATENT DOCUMENTS

| | | | |
|---|---|---|---|
| 7,746,636 B2 * | 6/2010 | Tang | G06F 1/1616 |
| | | | 361/679.55 |
| 7,808,776 B2 | 10/2010 | Bauer et al. | |
| 7,855,883 B2 * | 12/2010 | Tang | G06F 3/0208 |
| | | | 361/679.55 |
| 8,520,382 B2 * | 8/2013 | Tye | G06F 1/203 |
| | | | 361/694 |
| 9,740,253 B2 * | 8/2017 | Cheng | G06F 1/1616 |
| 10,627,874 B2 * | 4/2020 | Lin | G06F 1/1681 |
| 2006/0077622 A1 | 4/2006 | Keely et al. | |
| 2011/0280428 A1 * | 11/2011 | Tseng | H04R 1/2811 |
| | | | 381/332 |
| 2013/0038995 A1 | 2/2013 | Fang | |
| 2013/0308268 A1 * | 11/2013 | Tani | G06F 1/1679 |
| | | | 361/679.57 |

FOREIGN PATENT DOCUMENTS

| | | |
|---|---|---|
| CN | 203133677 U | 8/2013 |
| EP | 0834792 A2 | 4/1998 |
| TW | 476873 | 2/2002 |
| TW | M360534 | 7/2009 |

\* cited by examiner

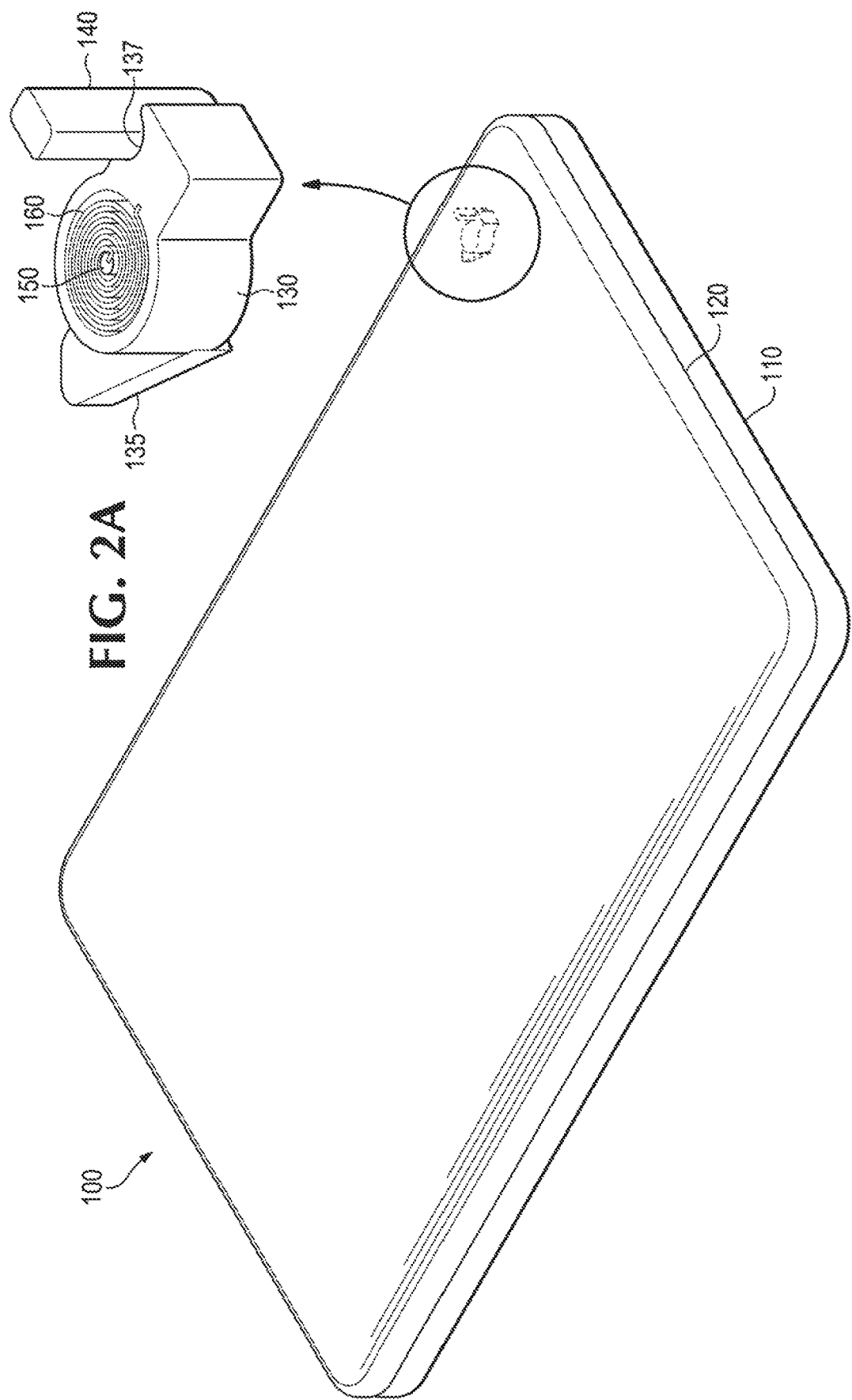

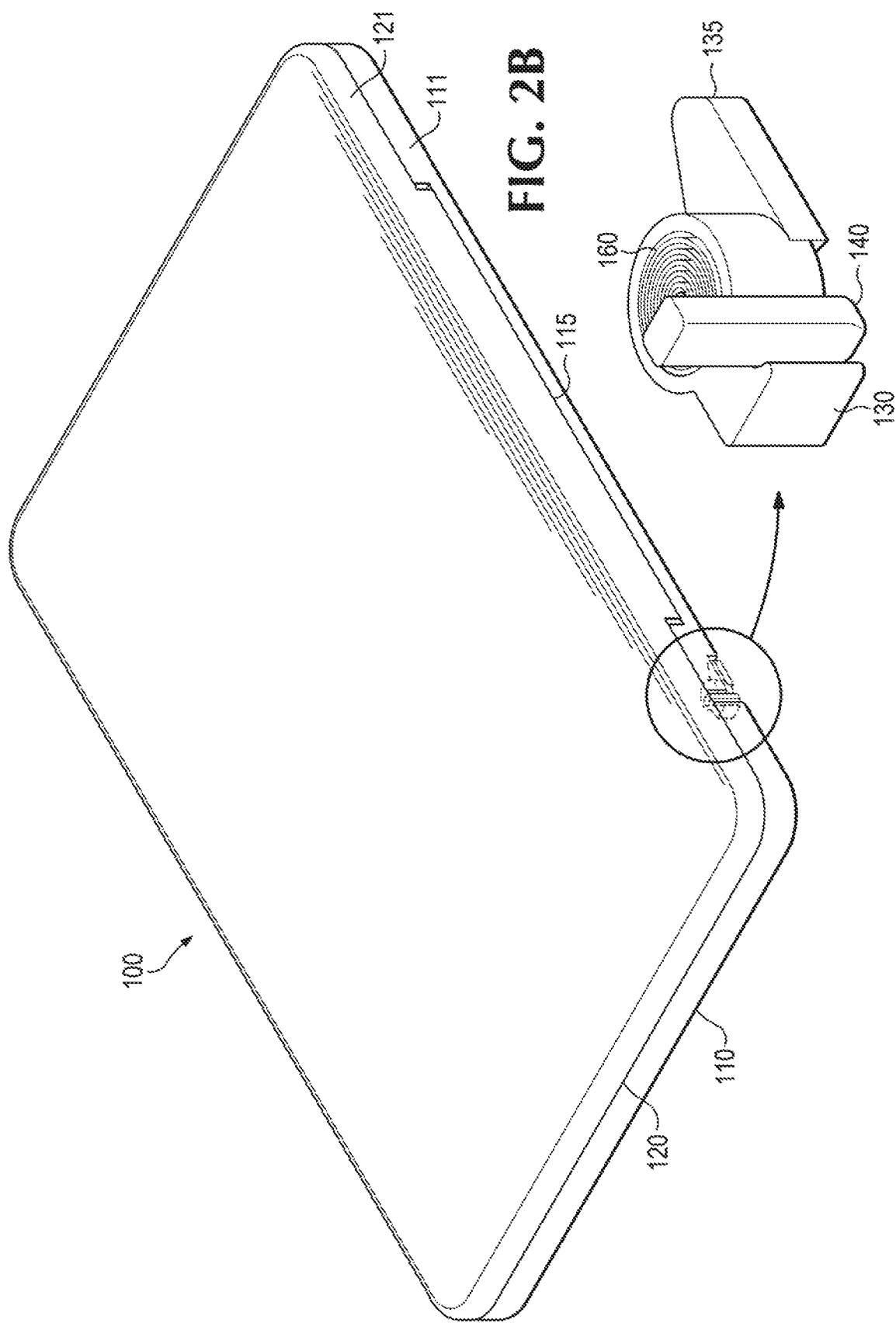

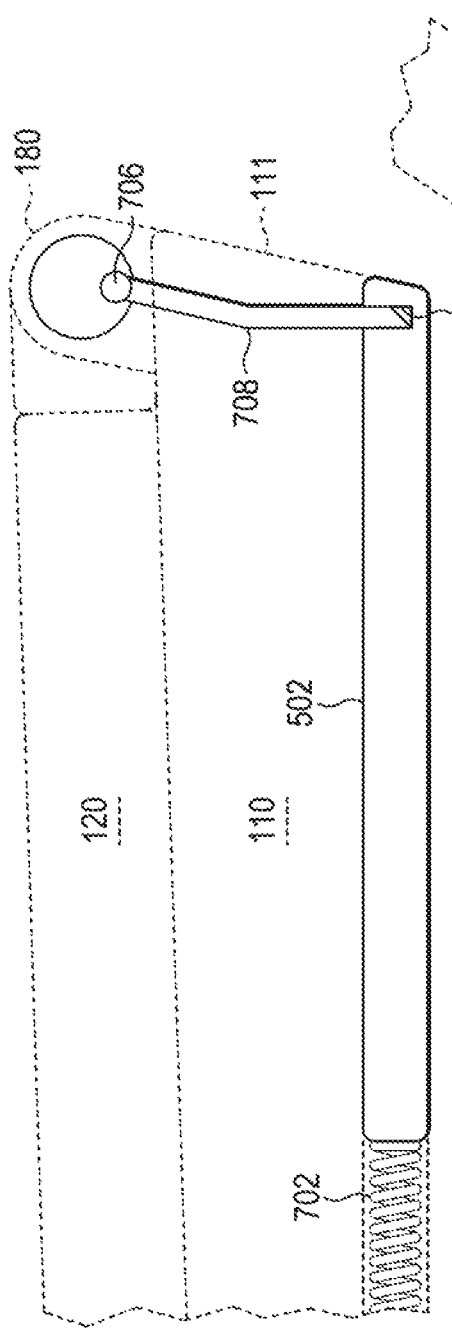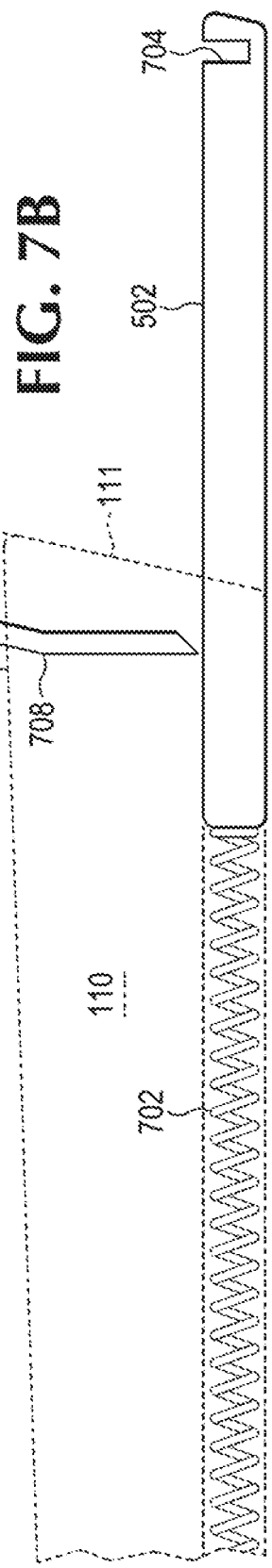

RETRACTABLE STRUCTURE FOR A COMPUTING DEVICE

BACKGROUND

The emergence and popularity of mobile computing has made portable computing devices, due to their compact design and light weight, a staple in today marketplace. Within the mobile computing realm, notebook computers, or laptops, are one of the most widely used devices and generally employ a clamshell-type design consisting of two members connected together at a common end via hinges, for example. In most cases, a first or display member is utilized to provide a viewable display to a user while a second or base member includes an area for user input (e.g., touchpad and keyboard). In addition, the viewable display may be a touchscreen (e.g., touchscreen laptop), allowing the user to interact directly with what is displayed by touching the screen with simple or multi-touch gestures.

BRIEF DESCRIPTION OF THE DRAWINGS

FIGS. 2A-B illustrate the computing device 100 in a closed, folded position, according to an example;

FIGS. 7A-B illustrate a side profile of the structure 502 when the computing device 100 is in a closed position and an open position, respectively, according to an example.

DETAILED DESCRIPTION

Figure 1:
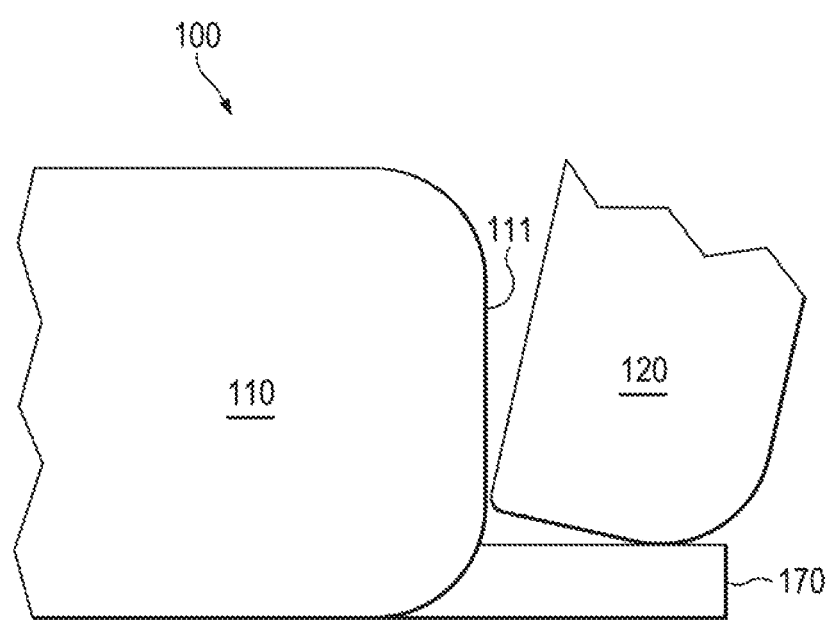
FIG. 1 illustrates a computing device 100 in an open position, according to an example.

Notebook computers may include a feature that allows the device to be "converted" from one style of use to another style of use. For example, a notebook computer may be converted from a laptop mode, where the touchpad and keyboard of the base member is available to be used as input, to a tablet mode, where the display member may be detached from a hinge assembly and the display of the display member may be used for both viewing and input. Such devices that serve this dual purpose may be called convertible laptops. In addition to choosing between laptop mode and tablet mode, notebook computers may be used concurrently according to various styles of use. For example, while in laptop mode, in addition to using the touchpad and keyboard as input, the display of the display member may also be used as input (e.g., a touchscreen laptop).

Users of touchscreen laptops may appreciate the flexibility of choosing between various input methods. However, when, a user interacts directly with the display surface of the laptop, for example, by touching the screen through simple or multi-touch gestures, the weight of the display member with respect to the base member may need to be taken into consideration. For example, if the display member weighs more than the base member, gestures a user makes by touching the display surface may cause the laptop to topple backwards, which may not be desirable and negatively impact the user experience. Even if the display member weighs less than the base member, a sufficient amount of force applied to the display surface may also cause the laptop to topple backwards. A challenge faced by manufacturers of touchscreen laptops is improving the user experience when such laptops are used concurrently according to various styles of use.

Examples disclosed herein provide a structure for supporting a computing device in an open position, particularly when a user interacts directly with the display surface of the device (e.g., by touching the screen through simple or multi-touch gestures). Utilizing the structure while operating the computing device in the open position bray ensure a positive user experience by reducing the chances of the device toppling backwards.

In one example, a computing device can include a base member and a display member coupled to the base member by a hinge assembly. The computing device can include a structure disposed within the base member and pivotally connected to the base member via a shaft. The structure can include an extension that is retractable within a rear sidewall of the base member. The computing device can include a lever coupled to the structure, wherein when the display member is rotated towards an open position with respect to the base member, the lever can rotate the extension out from a retracted state from the rear sidewall of the base member.

In another example, a computing device can include a base member and a hinge assembly to couple a display member to the base member. The computing device can include a structure disposed within the base member, wherein the structure is retractable within a rear sidewall of the base member and is extendable from the rear sidewall when the hinge assembly is in an open position with respect to the base member.

In yet another example, computing device can include a base member and a hinge assembly to couple a display member to the base member. The computing device can include a structure pivotally connected within the base member via a shaft. The structure can include an extension that is retractable within a rear sidewall of the base member. The computing device can include a lever attached to the hinge assembly, wherein when the hinge assembly is rotated towards an open position with respect to the base member, the lever can push the extension out from a retracted state from the rear sidewall of the base member along a longitudinal plane of the base member.

With reference to the figures, FIG. 1 illustrates a computing device 100, such as a touchscreen laptop, in an open position, according to an example. The computing device 100 includes a base member 110 and a display member 120 that may be joined together via a hinge assembly 115 (e.g., see FIG. 2B). As an example, the base member 110 includes an area for user input, such as a touchpad and a keyboard. The display member 120 includes a display screen for viewing the video output of the device 100, and may include input means for operation by a user, such as a touchscreen (e.g. the display screen may be the touchscreen).

As an example, the display member 120 may include sidewalls around a perimeter of the display member 120. For example, the display member 120 may include four sidewalls (e.g., a left sidewall, a right sidewall, a top sidewall, and a bottom sidewall 121). Similarly, the base member 110 may include sidewalls around a perimeter of the base member 110. For example, the base member 110 may include four sidewalls (e.g., a left sidewall, a right sidewall, a front sidewall, and a rear sidewall 111). As illustrated in FIG. 2B, the bottom sidewall 121 of the display member 120 and the rear sidewall 111 of the base member 110 may be joined together via the hinge assembly 115.

As an example, the computing device 100 may include a structure 170 for supporting the device 100 on a surface while it is in use (e.g., when the device 100 is in an open position). The surface may be a level surface, such as, for example, a desk or table, or a surface that is not level. The structure 170 may prevent the computing device 100 from toppling backwards, particularly when a user interacts directly with the touchscreen of the display member 120, for example, by touching the screen through simple or multi-touch gestures. The structure 170 may be composed of any material with an appropriate level of thickness for properly supporting the device 100 on the surface, such as a durable plastic or metal material. As an example, the portion of the structure 170 that makes contact with the surface may include non-skid elements for frictionally supporting the computing device 100 on the surface. The non-skid elements may be composed of a material such as rubber, that provides a level of frictional resistance between the elements and the surface.

As an example, the structure 170 may be retractable within the rear sidewall 111 of the base member 110 (e.g., a retracted state), and extended (e.g., along a longitudinal plane of the base member 110) when required to support the computing device 100 in the open position, as will be further described. By using the structure 170 to support the computing device 100 while it is in use, the amount of force applied to the screen of the display member 120 that is required for the device 100 to topple backwards may be increased, compared to using a computing device without the structure 170. As a result, utilizing the structure 170 while operating the computing device 100 in the open position may ensure a positive user experience by reducing the chances of the device 100 toppling backwards. The structure 170 used may vary according to different embodiments, as will be further described.

FIGS. 2A-B illustrate computing device 100 in a closed, folded position, according to an example. While the computing device 100 is in the closed, folded position, the device 100 may be closed and the display screen of the display member 120 may not be visible. As an example, the computing device 100 may include a structure 130 for supporting the device 100 on a surface while it is in use, for example, when the device 100 is in an open position from its closed, folded position. The structure 130 includes an extension 135 that may prevent the computing device 100 from toppling backwards, particularly when a user interacts directly with the touchscreen of the display member 120, for example, by touching the screen through simple or multi-touch gestures. Referring back to FIG. 1, the structure 170 may refer to structure 130 in FIG. 2A, which includes extension 135.

As will be further described, the extension 135 may provide support for operating the computing device 100 in the open position. For example, the extension 135 may support a sidewall of the display member 120 (e.g., the bottom sidewall 121) on the surface, as illustrated in FIG. 3B. As an example, the portion of the extension 135 that makes contact with the surface may include non-skid elements for frictionally supporting the computing device 100 on the surface. Referring to FIGS. 2A-B, the structure 130 may be disposed within the base member 110 along the rear sidewall 111 of the base member 110. The placement of the structure 130 may vary from what is illustrated in the figures. In addition, more than one structure 130 may be used. Although the display member 120 of the computing device 100 may weigh more than the base member 110, utilizing the structure 130 while operating the computing device 100 in the open position may ensure a positive user experience by preventing the toppling.

When the computing device 100 is in the closed, folded position (e.g., not being used), the structure 130, particularly the extension 135 may be retracted within the base member 110 of the device 100, as illustrated in FIGS. 2A-B (e.g., the retracted state). In order to be retractable within the base member 110, the structure 130 may be pivotally connected to the base member 110 via a shaft 150 disposed and fixed within the base member 110. As an example, the shaft 150 may be a rod fixed within the base member 110 to at least a top surface or a bottom surface of the base member 110, allowing the structure 130 to rotate around at least a portion of the shaft 150. Referring to FIG. 2B, the extension 135 may be flush with the rear sidewall 111 of the base member 110 while the structure 130 is in the retracted state. As a result, chances of damaging any portion of the structure 130 while in the retracted state may be reduced, potentially increasing the longevity of the use of the structure 130.

When the display member 120 is rotated towards an open position with respect to the base member 110, the extension 135 may be rotated out (e.g., along longitudinal plane of the base member 110), via the shaft 150, from the retracted state. Similarly, when the display member 120 is rotated towards the closed position with respect to the base member 110, the extension 135 may be rotated to the retracted state within the rear sidewall 111 of the base member 110. As an example, the rotation of the extension 135 with respect to the opening and closing of the display member 120 may be controlled by a lever 140. The lever 140 may be attached, for example, to the hinge assembly 115 or the display member 120 (e.g., see FIG. 3A). By allowing the lever 140 to pivot at the point of attachment (e.g., to the hinge assembly 115 or the display member 120), the movement of the lever 140 may correspond to the movement of the display member 120. As an example, the lever 140 may be coupled to the structure 130 along a groove 137 of the structure 130. For example, the lever 140 may initiate movement of the structure 130 by making contact with the structure 130 along the groove 137. As an example, the lever 140 may be a beam or rigid rod in order to initiate the movement of the structure 130.

Figure 3A:
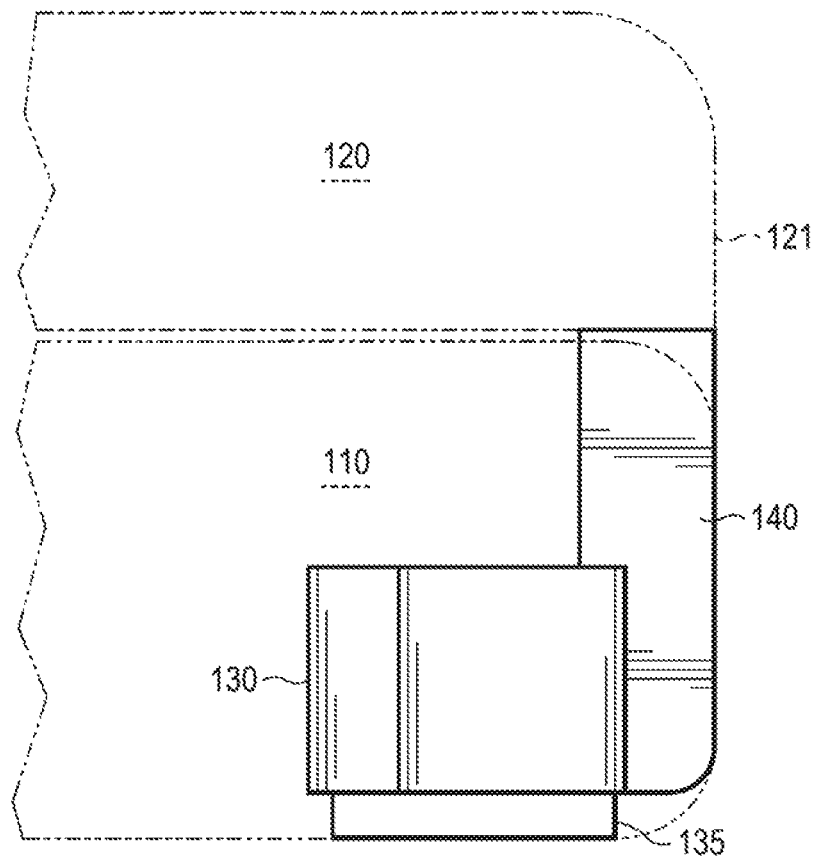
FIGS. 3A-B, illustrate a side profile of a structure 130 when the computing device 100 is in a closed position and an open position, respectively, according to an example.
Figure 3B:
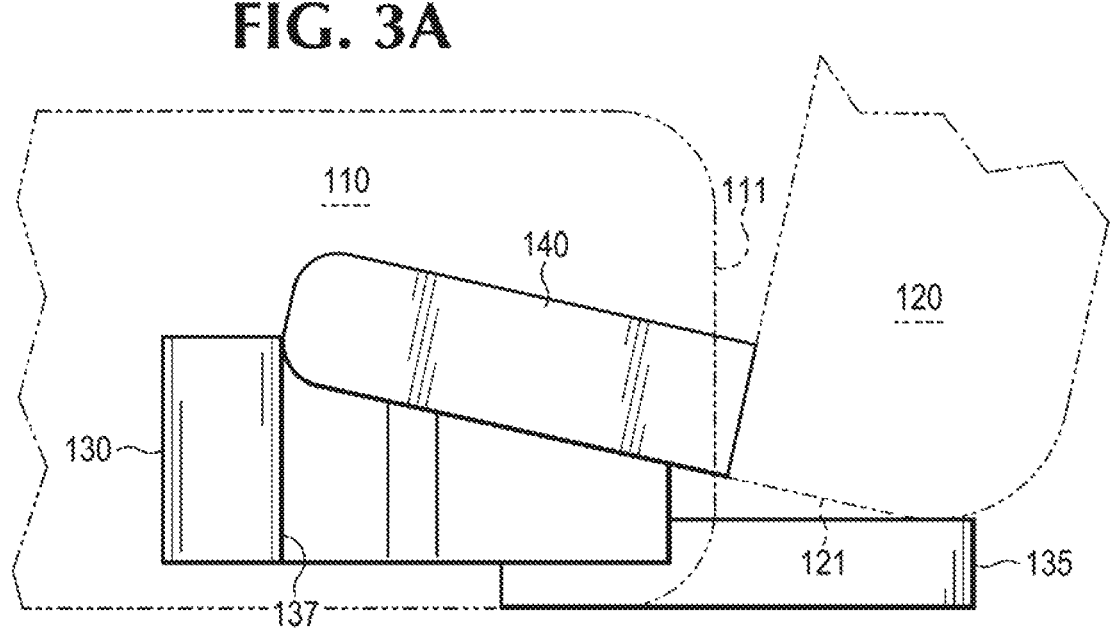

FIGS. 3A-B illustrate a side profile of the structure 130 when the computing device 100 is in a closed position and an open position, respectively, according to an example. Referring to FIG. 3B, when the computing device 100 is in the open position, or being rotated towards the open position, the lever 140 may rotate (or push) the extension 135 out from a retracted state from the tear sidewall 111 of the base member 110. As the lever 140 is pushing the structure 130 along the groove 137, the structure 130 may rotate via the shaft 150. By using the structure 130 (including the extension 135) to support the computing device 100 while it is in use, the amount of force applied to the screen of the display member 120 that is required for the device 100 to topple backwards may be increased, compared to using a computing device without the structure 130, resulting in a positive user experience. As illustrated, the extension 135 may support a sidewall of the display member 120 (e.g., the bottom sidewall 121) on the surface, as an example.

Referring to FIG. 3A, when the display member 120 is in a closed position, or being rotated towards the closed position, the lever 140 may rotate (or pull) the extension 135 back to the retracted state within the rear sidewall 111 of the base member 110. As mentioned above, the lever 140 may be coupled to the structure 130 along a groove 137 of the structure 130. As a result, the rotation of the extension 135 with respect to the opening and closing of the display member 120 lay be controlled by the lever 140.

Figure 4A:
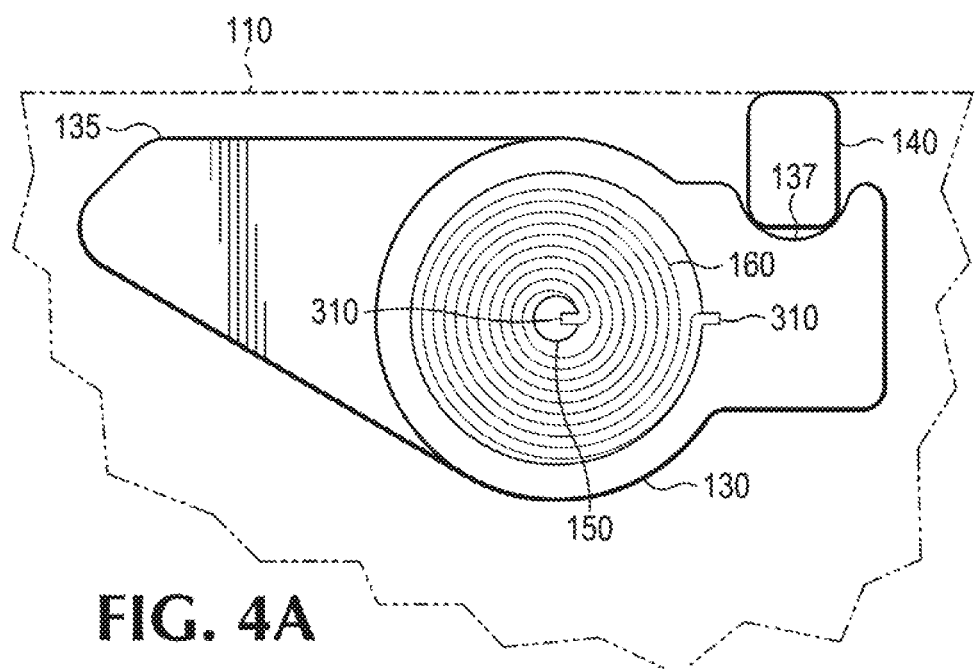
FIGS. 4A-B illustrate a spring 160 fitted over a shaft 150 and disposed within the structure 130, according to an example.
Figure 4B:
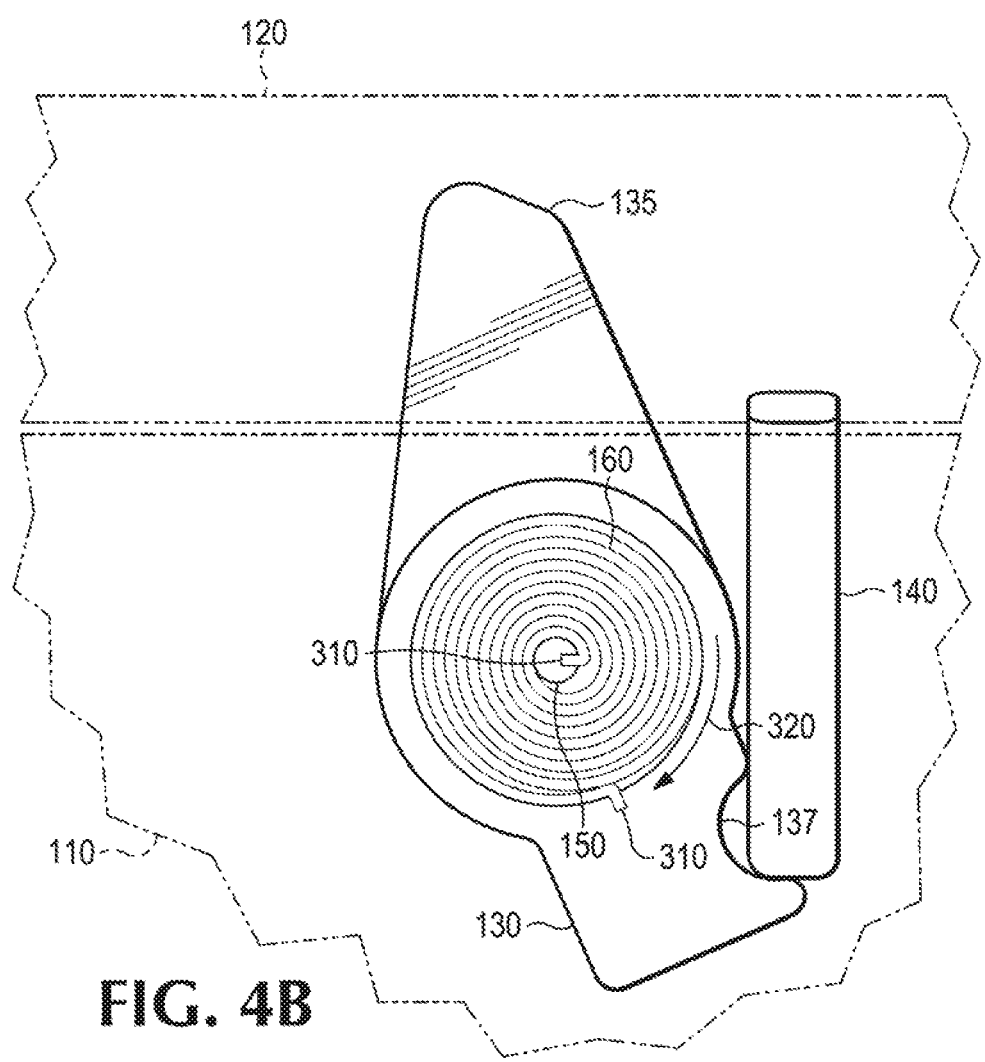

FIGS. 4A-B illustrate a spring 163 fitted over the shaft 150 and disposed within the structure 130, according to an example. One end 310 of the spring 160 may be fitted to the structure 130 and the other end 310 may be fitted to the shaft 150. The spring 160 may be utilized to bias the extension 135 back to the retracted state within the rear sidewall 111 of the base member 110, for example, when the display member 120 is rotated towards the closed position. As an example, the spring 160 may be a torsion spring that is twisted about the shaft, as illustrated in FIGS. 4A-B. Referring to FIG. 4B, when the display member 120 is rotated towards the open position, the torsion spring 160 may be placed under tension (or compressed) as the extension 135 is rotated (indicated as 320) out from the retracted state from the rear sidewall 111. When the torsion spring 160 is pieced under tension, the spring 160 may store mechanical energy that is released, for example, when the display member 120 is rotated towards the closed position.

Referring to FIG. 4A, when the display member 120 is rotated towards the closed position, the tension (or compression) may be released such that the torsion spring 160 may bias the extension 135 back to the retracted state by releasing the tension. The spring 160 may ensure that the extension 135 is fully retracted within the rear sidewall 111 of the base member 110 when the computing device 100 is in a closed position.

Figure 5A:
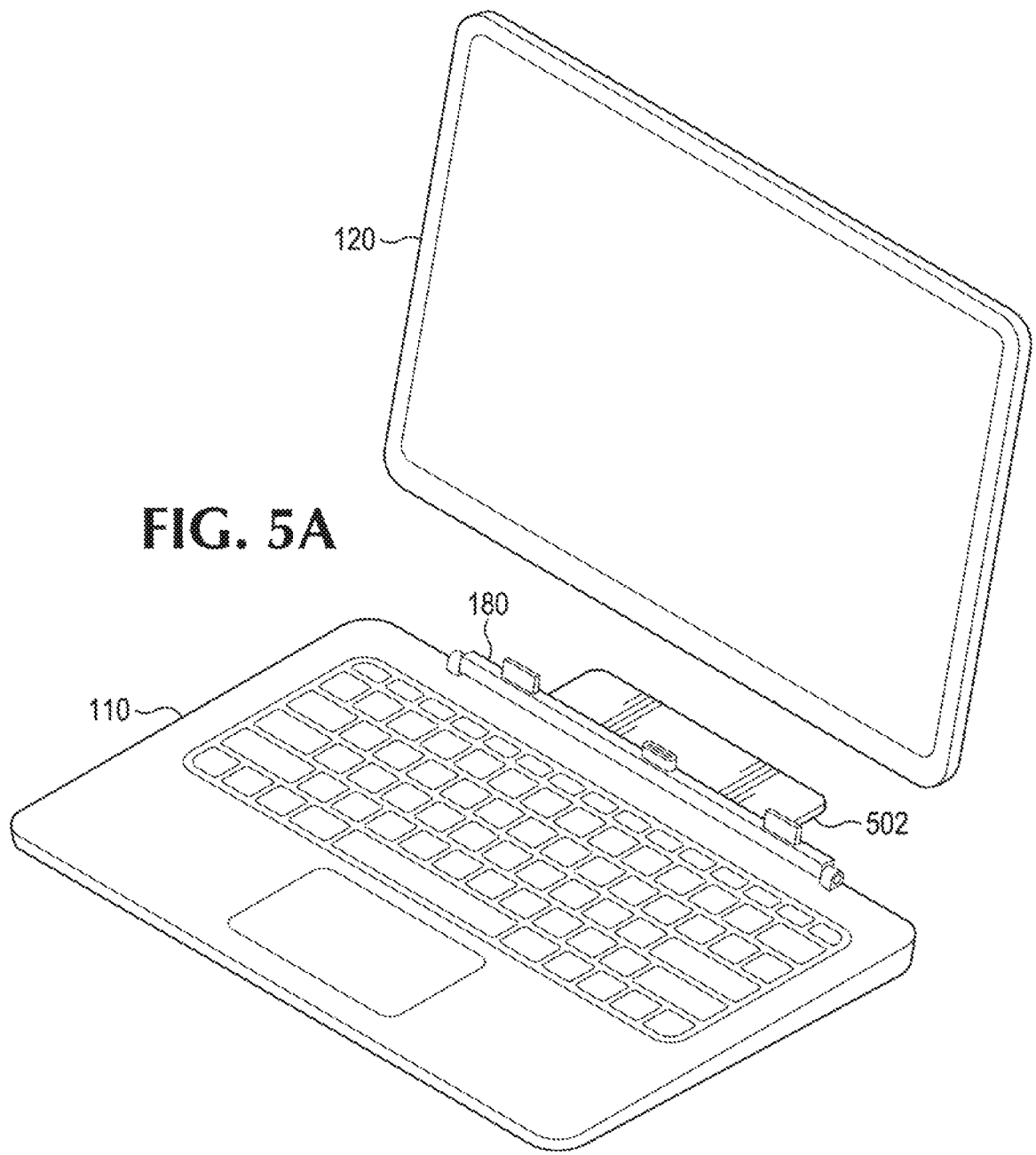
FIGS. 5A-B illustrate a computing device 100 with a structure 502 for supporting the device 100 on a surface while it is in use, according to an example.
Figure 5B:
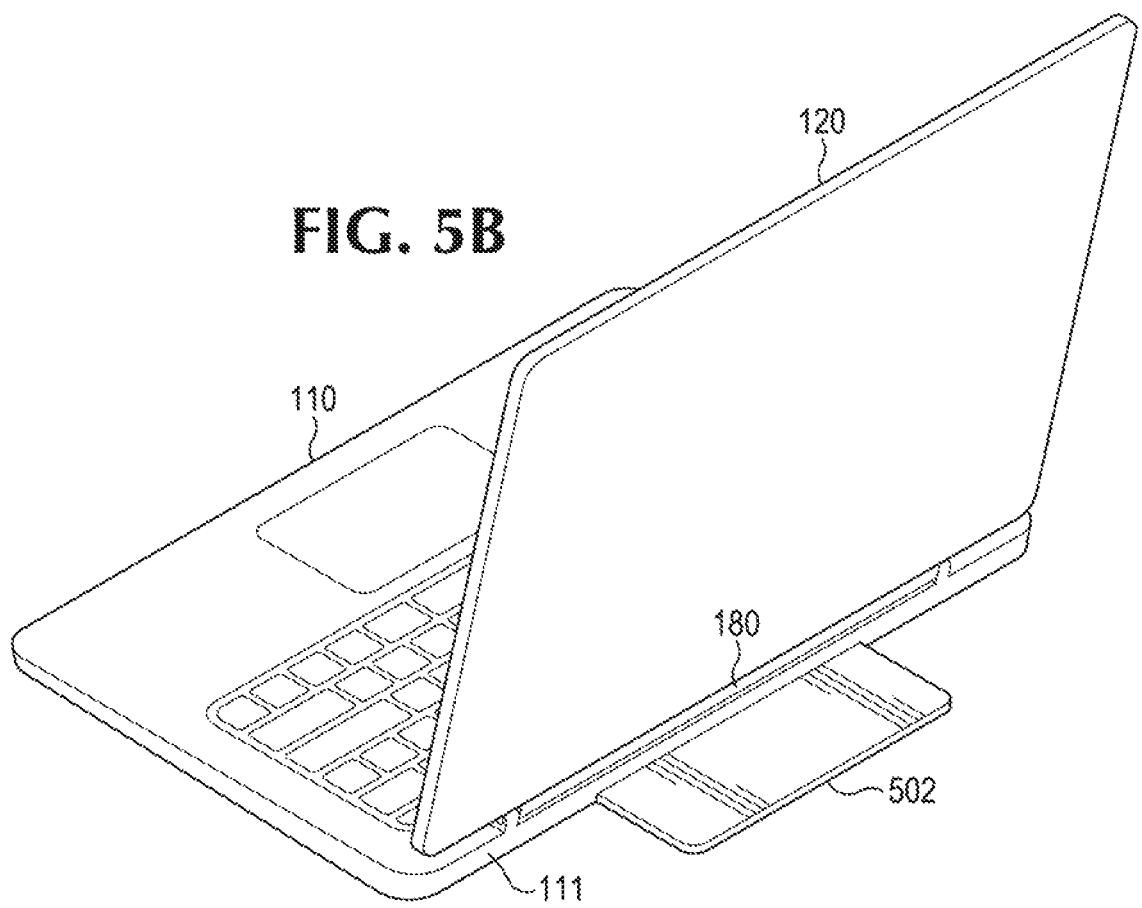

FIGS. 5A-B illustrate a computing device 100 with a structure 502 for supporting the device 100 on a surface while it is in use, according to an example. The computing device 100 may include a base member 110, and a hinge assembly 180 to couple a display member 120 to the base member 110. The structure 502 may be retractable within the rear sidewall 111 of the base member 110, and extended (i.e., deployed) when required to support the computing device 100 in the open position, as illustrated. The placement of the structure 502 may vary from what is illustrated in the figures. In addition, more than one structure 502 may be used. Referring back to FIG. 1, the structure 170 may refer to structure 502 in FIG. 5A.

When the computing device 100 is not in use (e.g., when the device 100 is in a closed, folded position), the structure 502 may be retracted to occupy an area within the base member 110 (e.g., a retracted state). As an example, the structure 502 may be flush with the rear sidewall 111 of the base member 110 while the structure 502 is in the retracted state (e.g., see FIG. 6A). Upon use, the structure 502 may be slid out from the rear sidewall 111 of the base member 110. As an example, the retraction and deployment of the structure 502 may take place automatically and/or manually (e.g., with user intervention).

Figure 6A:
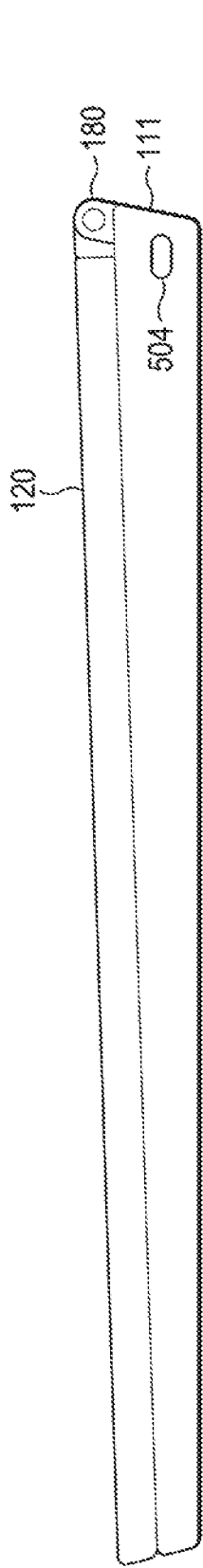
FIGS. 6A-C illustrate a releasing mechanism 504 for extending the structure 502, according to an example.
Figure 6B:
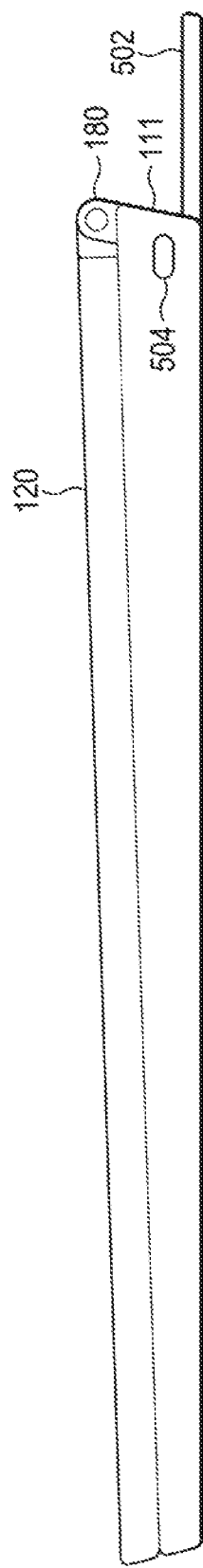
Figure 6C:
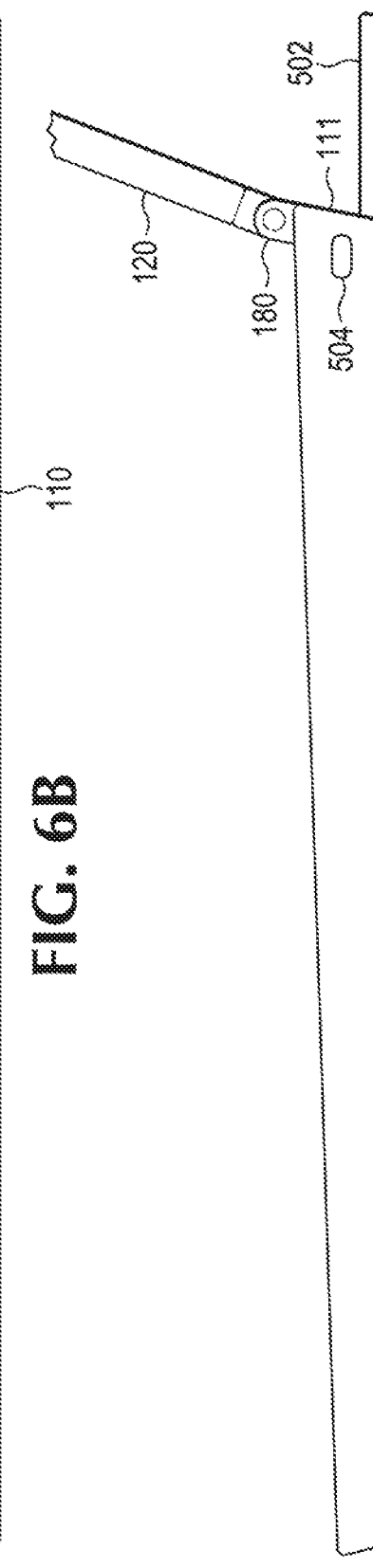

With respect to manual retraction and deployment, the computing device 100 may include a releasing mechanism 504 for extending the structure 502, as illustrated in FIGS. 6A-C, according to an example. When the releasing mechanism 504 is depressed, the structure 502 may extend from the rear sidewall 111 of the base member 110 (e.g., see FIG. 6B), As an example, the structure 502 may be spring-loaded within the base member 110 via one or more springs, such that the structure 502 may deploy via the springs when the releasing mechanism 504 is pressed. With respect to manual retraction and deployment, movement of the structure 502 may be independent of the movement of the hinge assembly 180 with respect to the base member 110 (e.g., see FIGS. 6B and 6C). By having the ability to manually deploy the structure 502, the user of the computing device 100 may have control on whether to utilize the structure 502 to support the device 100 on a surface. For example, if the user is using the computing device 100 where space is limited, the user may choose not to utilize the structure 502.

With respect to automatic retraction and deployment, movement of the structure 502 may correspond to movement of the hinge assembly 180 with respect to the base member 110 (e.g., see FIGS. 7A-B). For example, when the display member 120 is in a closed position, or being rotated towards the closed position, the structure 502 may automatically retract (or be manually retracted, for example, with user intervention) to occupy the area within the base member 110. Similarly, when the computing device 100 is in the open position, or being rotated towards the open position, the structure 502 may automatically deploy from the rear sidewall 111 of the base member 110 (e.g., see FIG. 7B). As an example, the structure 502 may begin deploying only after the hinge assembly 180 is rotated to a certain degree. For example, the structure 502 may begin deploying only after the hinge assembly 180 is rotated past 120 degrees, where use of the structure 502 may be of benefit to support the computing device 100 on a surface. The structure 502 may be spring loaded within the base member 110 via one or more springs, such that the structure 502 may deploy from the rear sidewall via the springs.

FIGS. 7A-B illustrate, a side profile of the structure 502 when the computing device 100 is in a closed position and an open position, respectively, according to an example. The hinge assembly 180 may include a cam 706 and a lock pin 708 for controlling when the structure 502 may be deployed (e.g., after the hinge assembly 180 is rotated to a certain degree). As an example, movement of the cam 706 may correspond to the rotation of the hinge assembly 180, and the vertical movement of the lock pin 708 may correspond to the movement of the cam 706.

Referring to FIG. 7A, when the di play member 120 is in a closed position, the lock pin 708 may be disposed within a slot 704 of the structure 502, preventing the structure 502 from being deployed from the rear sidewall 111 of the base member 110. Referring to FIG. 7B after the hinge assembly 180 is rotated to a certain degree (e.g., 120 degrees), the lock pin 708 may be released from the slot 704, allowing the structure 502 to deploy. As mentioned above, the structure 502 may be spring-loaded within the base member 110 via one or more springs 702, such that the structure 502 may deploy via the springs 702 upon release from the lock pin 708. By using the structure 502 to support the computing device 100 while it is in use, the amount of force applied to the screen of the display member 120 that is required for the device 100 to topple backwards may be increased, compared to using a computing device without the structure 502, resulting in a positive user experience.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A computing device comprising:
   a base member;
   a display member coupled to the base member by a hinge assembly;
   a structure disposed within the base member and pivotally connected to the base member via a shaft, wherein the structure comprises an extension with non-skid elements that is retractable within a rear sidewall of the base member; and
   a lever coupled to the structure, wherein when the display member is rotated towards an open position with respect to the base member, the lever is to rotate the extension out from a retracted state along a longitudinal plane with the base member from the rear sidewall of the base member so that the structure and a bottom of the base member are flush.

2. The computing device of claim 1, wherein when the display member is rotated towards a closed position with respect to the base member, the lever is to rotate the extension to the retracted state within the rear sidewall of the base member.

3. The computing device of claim 2, comprising:
   a spring fitted over the shaft and disposed within the structure, wherein the spring is to bias the extension back to the retracted state when the display member is rotated towards the closed position.

4. The computing device of claim 3, wherein the spring is a torsion spring twisted about the shaft, and wherein:
   when the display member is rotated towards the open position, the torsion spring is placed under tension, and
   when the display member is rotated towards the closed position, the tension is released such that the torsion spring is to bias the extension back to the retracted state by releasing the tension.

5. The computing device of claim 3, wherein the spring is to store mechanical energy when the display member is rotated towards the open position and the spring is to release the mechanical energy when the display member is rotated towards the closed position such that the spring is to bias the extension back to the retracted state by releasing the mechanical energy.

6. A computing device comprising:
   a base member;
   a hinge assembly to couple a display member to the base member;
   a structure disposed within the base member and pivotally connected to the base member via a shaft, wherein the structure comprises an extension with non-skid elements that is retractable within a rear sidewall of the base member and is extendable along a longitudinal plane with the base member from the rear sidewall so that the structure and a bottom of the base member are flush when the hinge assembly is in an open position with respect to the base member.

7. The computing device of claim 6, comprising a lever coupled to the structure, wherein when the hinge assembly is rotated towards the open position with respect to the base member, the lever is to rotate the extension out from a retracted state from the rear sidewall of the base member.

8. The computing device of claim 7, wherein when the hinge assembly is rotated towards a closed position with respect to the base member, the lever is to rotate the extension to the retracted state within the rear sidewall of the base member.

9. The computing device of claim 6, wherein the structure is to manually extend to provide support for operating the display member in the open position.

10. The computing device of claim 6, wherein the structure is spring-loaded within the base member via one or more springs.

11. The computing device of claim 10, wherein when the hinge assembly is rotated towards the open position with respect to the base member, the structure is to automatically extend from the rear sidewall via the springs.

12. The computing device of claim 10, comprising a releasing mechanism for extending the structure, wherein when the releasing mechanism is depressed, the structure is to extend from the rear sidewall via the springs.

13. A computing device comprising:
   a base member;
   a hinge assembly to couple a display member to the base member;
   a structure pivotally connected within the base member via a shaft, wherein the structure comprises an extension with non-skid elements that is retractable within a rear sidewall of the base member; and
   a lever attached to the hinge assembly, wherein when the hinge assembly is rotated towards an open position with respect to the base member, the lever is to push the extension out from a retracted state from the rear sidewall of the base member along a longitudinal plane of the base member so that the structure and a bottom of the base member are flush.

14. The computing device of claim 13, wherein when the hinge assembly is rotated towards a closed position with respect to the base member, the lever is to rotate the extension to the retracted state within the rear sidewall of the base member.

* * * * *